(12) United States Patent
Sonoda

(10) Patent No.: US 6,647,452 B1
(45) Date of Patent: Nov. 11, 2003

(54) AUTOMATIC RECOVERY OF NON-RESPONSIVE PERIPHERAL DEVICE BY APPARENT DISCONNECT AND RECONNECT

(75) Inventor: Yuko Sonoda, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 416 days.

(21) Appl. No.: 09/650,941

(22) Filed: Aug. 30, 2000

(30) Foreign Application Priority Data

Sep. 2, 1999 (JP) .......................................... 11-248521

(51) Int. Cl.⁷ .............................................. G06F 13/00
(52) U.S. Cl. .......................... 710/305; 710/15; 710/72; 714/5
(58) Field of Search .......................... 710/8–19, 62–74, 710/305; 714/1–5

(56) References Cited

U.S. PATENT DOCUMENTS

| 5,761,448 A | | 6/1998 | Adamson et al. | |
| 6,012,103 A | * | 1/2000 | Sartore | 710/8 |
| 6,073,193 A | * | 6/2000 | Yap | 710/100 |
| 6,101,076 A | * | 8/2000 | Tsai et al. | 361/90 |
| 6,131,134 A | * | 10/2000 | Huang et al. | 710/302 |
| 6,205,502 B1 | * | 3/2001 | Endo et al. | 710/100 |
| 6,279,060 B1 | * | 8/2001 | Luke et al. | 710/64 |
| 6,415,342 B1 | * | 7/2002 | Wahl et al. | 710/100 |

* cited by examiner

Primary Examiner—Sumati Lefkowitz
(74) Attorney, Agent, or Firm—Brinks, Hofer Gilson & Lione

(57) ABSTRACT

A change-over switch is disposed on a line of a peripheral device. The change-over switch is controlled by a control unit provided within a USB controller. When a host discontinues a polling operation to the peripheral device, the peripheral device first opens the circuit of the change-over switch so as to decrease the potential at a point of the host to substantially the same potential of a ground line. Then, the peripheral device closes the circuit of the change-over switch to increase the potential at the point to be close to a power supply voltage. Accordingly, the host determines that the peripheral device is reconnected to the host, and starts the polling operation. In this way, the peripheral device is apparently disconnected and reconnected, thereby allowing for recovery without the actual physical disconnection and reconnection of the peripheral device.

18 Claims, 4 Drawing Sheets

AUTOMATIC RECOVERY OF NON-RESPONSIVE PERIPHERAL DEVICE BY APPARENT DISCONNECT AND RECONNECT

BACKGROUND OF THE INVENTION

1. Field of the Invention

The present invention generally relates to a connection unit for a peripheral device which is connected to a host by using, for example, a Universal Serial Bus (USB) interface. More particularly, the invention relates to a connection unit for a peripheral device that automatically recovers the connection when an abnormality occurs in the communication between the peripheral device and the host.

2. Description of the Related Art

An example of a conventional connection arrangement between a host and a peripheral device is illustrated in FIG. 5. In particular, FIG. 5 shows a block circuit diagram for a connection between a conventional USB-compatible peripheral device (terminal) 10 and a host (computer unit) 2. The peripheral device 10 that is to be connected to the host 2 via a USB may be one of various types of devices, such as a keyboard, a mouse, a printer, a speaker, a game controller, etc.

In FIG. 5, he USB is formed of four lines, such as a pair of data lines (D+ line and D− line), a power line (Vcc), and a ground line (G).

As shown in FIG. 5, a USB port 3 is provided in the host 2, and a USB controller 11 is provided in the peripheral device 10. The USB controller 11 is connected to the USB port 3 via a USB-compatible cable 4.

The data line D− of the USB port 3 is connected to one end of a pull-down resistor $R_1$, and the data line D+ of the USB port 3 is connected to one end of a pull-down resistor $R_2$. The other ends of the pull-down resistors $R_1$ and $R_2$ are connected to ground lines G.

In the peripheral device 10, one end of a pull-up resistor $R_3$ is connected to the D− line and the other end is connected to the power line (Vcc).

With the configuration illustrated in FIG. 5, when the peripheral device 10 is not connected to the host 2, the potential at a point P is 0 volts (low state). When the peripheral device 10 is connected to the host 2, the D− line, the D+ line, the power line Vcc, and a ground line of the peripheral device 10 are connected to the counterparts of the host 2, and the potential at the point P is increased (high state). When the host 2 identifies such a potential increase, it determines that the peripheral device 10 is connected to the host 2. Simultaneously, the host 2 starts to perform a polling operation by calling the peripheral device 10 at regular intervals so that mutual communication is established between the host 2 and the peripheral device 10. During the polling operation, in response to receiving a calling signal from the host 2, the peripheral device 10 returns a signal to the host 2. The peripheral device returns this signal regardless of whether or not the peripheral device 10 is being operated.

When the cable 4 is disconnected to remove the peripheral device 10 from the host 2, the point P is connected to the ground line G and thus decreases to 0 volts. A voltage or potential drop is detected in the host 2. From the voltage drop the host 2 determines that the peripheral device 10 is disconnected.

In this manner, by monitoring whether the potential at the point P is in the high state or the low state, the host 2 is able to determine whether the peripheral device 10 is connected or disconnected.

If, however, during polling there is no answer from the peripheral device 10 in response to three consecutive calls by the host 2, the host 2 discontinues the polling to the peripheral device 10, thereby interrupting the communication between the host 2 and the peripheral device 10. In order to recover from the interrupted communication, the cable 4 of the peripheral device 10 must first be disconnected from the USB port 3 so that the potential at the point P drops to a ground potential (low state). The cable 4 must then be re-inserted into the USB port 3 so that the potential is again raised to the high state. Alternatively, an operating system loaded on the host 2 must be restarted.

The peripheral device 10, on the other hand, has a resetting (initializing) function. For example, when a malfunction occurs in the peripheral device 10 (such as a voltage change, the departure of processing from a fixed program routine, or a memory malfunction) the peripheral device 10 automatically detects such a malfunction and performs the resetting operation. If there is no answer from the peripheral device 10 in response to the polling by the host 2 a predetermined number of times and communication therebetween is interrupted during the occurrence of such a malfunction, the peripheral device 10 performs the resetting operation to recover. When, a signal cannot be transmitted from the peripheral device 10 to the host 2, in spite of the resetting operation by the peripheral device 10, it is necessary to either remove the cable 4 from the USB port 3 and re-insert it to the USB port 3, or restart the system.

SUMMARY OF THE INVENTION

Accordingly, in order to solve the above-described problems, it is an object of the present invention to provide a connection unit for a peripheral device which automatically recovers from interrupted communication between the peripheral device and a host without the need for a user to restart the system or remove and re-insert a cable.

In order to achieve the above object, according to the present invention, a connection unit is provided for a peripheral device that is connected to a host via a data line. The data line is set to a first state at a predetermined potential (such as a high state) when communication between the peripheral device and the host is performed. The connection unit includes a recovering unit that establishes an apparently reconnected state between the peripheral device and the host by changing the potential of the data line to a second state (such as a low state) from the predetermined potential when the communication between the peripheral device and the host is disabled and then by changing the potential of the data line to the predetermined potential (high state).

With such a recovering unit, even if communication between the peripheral device and the host (polling from the host to the peripheral device) is interrupted, it can be apparently reconnected without the need to physically disconnect them, thereby automatically recovering to the normal communication state. This eliminates the need for the operator to remove and reinsert a cable between the peripheral device and the host or to restart the system.

In one embodiment of the connection unit, the data line may be connected to a ground via a first resistor in the host and may be connected to a power supply via a second resistor in the peripheral device. The recovering unit may establish the apparently reconnected state between the peripheral device and the host by setting the data line to the low state in the peripheral device and then by resetting the data line to the high state.

In the above-described embodiment of the connecting unit, the data line may include a D− line and a D+ line, and the recovering unit may establish the apparently reconnected state between the peripheral device and the host by setting at least one of the D− line and the D+ line to the low state in the peripheral device and then by resetting the data line to the high state.

For example, a switch for controlling the current flow may be provided as the recovering unit on at least one of the D− line or the D+ line of the peripheral device. When the peripheral device detects the interruption of the calling from the host or detects a malfunction occurring in the peripheral device, the switch is controlled to apparently disconnect the D− line or the D+ line between the peripheral device and the host. This decreases the potential of the D− line or the D+ line provided with the second resistor to the ground potential. The host thus determines that the peripheral device is disconnected although it is not physically removed. The peripheral device then resets the switch to the state it was in before the data line was apparently disconnected, thereby increasing the potential of the D− line or the D+ line. The host then determines that the peripheral device is reconnected.

In the above-described connecting unit, the recovering unit may establish the apparently reconnected state between the peripheral device and the host by connecting the data line to a ground or causing a portion between the data line and the power supply to have a high impedance to set the portion to the low state and then resetting the portion to the high state.

For example, in setting the data line to the low state, the data line may be directly grounded, or the second resistor between the data line and the power supply may be grounded. Alternatively, the data line may be temporarily opened, or the portion between the second resistor and the power supply may be opened, thereby causing it to become a high impedance. In this case, advantages similar to those exhibited by the above case may be obtained.

In the aforementioned connecting unit, the host may regularly call the peripheral device via the data line, and the recovering unit may establish the apparently reconnected state between the peripheral device and the host when there is no answer from the peripheral device in response to calling by the host a predetermined number of consecutive times.

In the recovering unit, the aforementioned predetermined number of consecutive times of calling is determined by the device specifications, and the recovering unit is operated when the peripheral device determines that the host is not calling.

In the above-described connecting unit, the recovering unit may establish the apparently reconnected state between the peripheral device and the host when detecting that one of a voltage change, a departure of processing from a fixed program routine, and a memory malfunction occurs in the peripheral device. The recovering unit may be operated not only when one of the above-described malfunction occurs in the peripheral device, but also when the calling to the peripheral device is interrupted due to a malfunction occurring in the host.

DESCRIPTION OF THE PREFERRED EMBODIMENTS

The present invention is described in detail below through illustration of preferred embodiments with reference to the accompanying drawings. In the following exemplary description, a personal computer is provided as a host and a device (such as a keyboard or a mouse) with a USB interface is provided as a peripheral device.

Figure 1A:
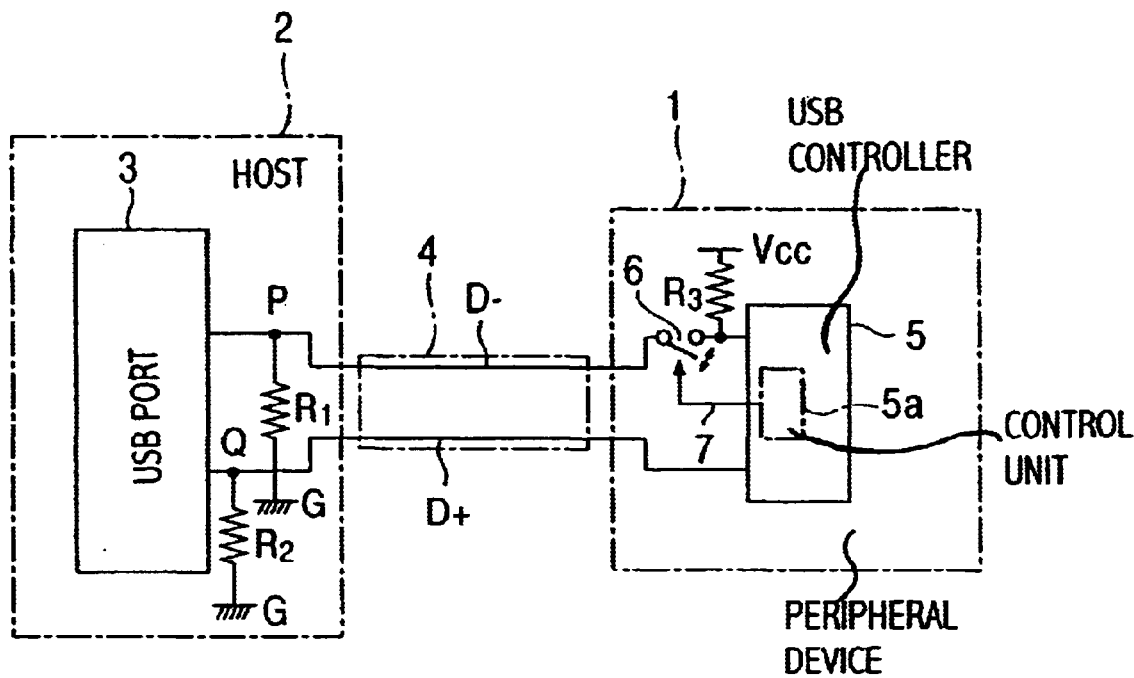
FIG. 1A is a circuit diagram illustrating a connecting unit for a peripheral device according to a first embodiment of the present invention.

Reference is first made to FIG. 1A in which a connecting unit for a peripheral device according to a first embodiment of the present invention is shown. A peripheral device 1 shown in FIG. 1A has a built-in USB controller 5, which is provided with a pair of data lines (D+ line and D− line). According to the USB interface system, communication is performed by using a pair of signal lines (D+ line and D− line), and supplying these two signal lines with a positive potential and a negative potential, which are inverted with each other.

A second resistor $R_3$ (hereinafter referred to as the pull-up resistor $R_3$) is connected at one end to the D− line within the peripheral device 1. The other end of the pull-up resistor $R_3$ is connected to a power line (Vcc).

A change-over switch 6 is also provided for the D− line. A control unit 5a is contained in the USB controller 5. The control unit 5 controls the change-over switch 6 to be on or off via a control line 7. The change-over switch 6 is normally closed. The D− line and the D+ line are connected to an interface circuit (not shown).

Figure 5:
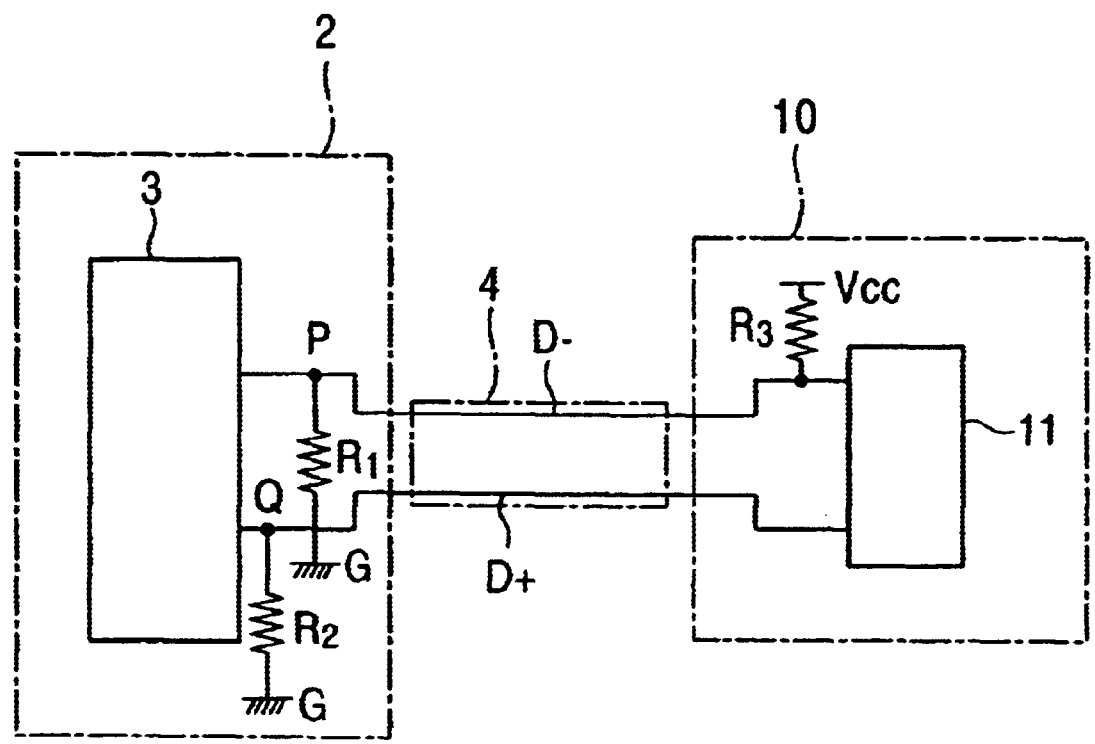
FIG. 5 is a circuit diagram illustrating a conventional connecting unit for a peripheral device.

As in the case of the host 2 shown in FIG. 5, a host 2 shown in FIG. 1A has a built-in USB port 3. The USB port 3 is provided with terminals formed by a pair of data lines (D+ line and D− line), a power line (not shown), and a ground line G. One end of a first resistor $R_1$ (hereinafter referred to as the pull-down resistor $R_1$) is connected to the D− line of the host 2, and the other end is connected to the ground line G. One end of another resistor $R_2$ (hereinafter referred to as the pull-down resistor $R_2$) is connected to the D+ line of the host 2, and the other end is connected to the ground line G.

When the peripheral device 1 and the host 2 are connected via a cable 4, the power line Vcc of the peripheral device 1 is connected to the power line of the host 2, so that the peripheral device 1 can receive power from the host 2. A ground line (not shown) of the peripheral device 1 is connected to the ground line G of the host 2.

When the peripheral device 1 is not connected to the host 2, a point P of the D− line shown in FIG. 1A is substantially at the same potential as that of the ground line G (ground potential, i.e., substantially 0 volts) (low state). When the peripheral device 1 is connected to the host 2, the D+ line and the D− line of the peripheral device 1 are connected to the counterparts of the host 2. As a result, the potential at the point P of the D− line is raised to a predetermined voltage (high state), which is different from the ground potential.

USB-compatible peripheral devices operate in a high speed mode (12 Mbits/s) or a low speed mode (1.5 Mbits/s) according to the specifications. It is determined in which mode the peripheral device is operated according to the type of peripheral device. That is, in low-speed-mode peripheral devices, a pull-up resistor is provided for the D− line, while in high-speed-mode peripheral devices, a pull-up resistor is provided for the D+ line. Accordingly, when a low-speed-mode peripheral device is connected to the host 2, connection lines are formed by the power line Vcc, the pull-up resistor $R_3$, the pull-down resistor $R_1$, and the ground line G. If the current flowing in the lines is indicated by I, the potential generated at the point P can be expressed by $(R_1/(R_1+R_3))\times I$ (see FIGS. 1 and 2). Conversely, when a high-speed-mode peripheral device is connected to the host 2, as shown in FIG. 3., connection lines are formed by the power line Vcc, a pull-up resistor $R_4$, the pull-down resistor $R_2$, and the ground line G. If the current flowing in the lines is indicated by I, the potential generated at a point Q shown in FIG. 3 can be expressed by $(R_2/(R_2+R_4))\times I$.

As stated above, the change-over switch 6 is controlled to be on or off by the control unit 5*a* disposed within the USB controller 5 via the control line 7. The change-over switch 6 may comprise a regular transistor, such as a junction transistor of a field effect transistor (FET). The on/off control operation by the control unit 5*a* on the change-over switch 6 is discussed below by using the peripheral device 1 and the host 2 shown in FIG. 1A as an example. In the normal state, a signal having a potential exceeding a predetermined potential (high signal) is input from the control unit 5*a* to the change-over switch 6 via the control line 7, thereby maintaining the change-over switch 6 in the open state. When a signal having a potential not greater than the predetermined potential (low signal) is input from the control unit 5*a* to the change-over switch 6 via the control line 7, the change-over switch 6 is closed. Conversely, the change-over switch 6 may be opened when a signal having a potential not greater than the predetermined potential is input, and may be closed when a signal having a potential exceeding the predetermined potential is input.

When the peripheral device 1 is connected, the host 2 performs a polling operation by calling the peripheral device 1 at regular intervals. If there is no answer in response to, for example, three consecutive calls, the host 2 discontinues the polling operation. The polling may be discontinued when malfunctions (such as a voltage increasing over a permissible level, the departure of processing from a fixed program routine, and a memory malfunction) occur.

The peripheral device 1 has a resetting (initializing) function. Upon detecting the above-described abnormality, the peripheral device 1 automatically performs the resetting operation. During the resetting operation, the polling operation is discontinued. If, however, the peripheral device 1 detects the occurrence of a malfunction and immediately resets itself while the host 2 is calling the peripheral device 1 three consecutive times, the polling may not be discontinued.

When the peripheral device 1 determines that the polling has discontinued, the change-over switch 6 is changed. As stated above, the change-over switch 6 is normally opened, and when a signal having a potential exceeding the predetermined potential is input from the control unit 5*a* via the control line 7, the circuit of the change-over switch 6 is opened. Accordingly, the D− line becomes a high impedance, and the potential at the point P is fixed at a potential substantially equal to the ground line G (ground potential) (low state). As a result, the host 2 detects the low potential of the point P and determines that the peripheral device 1 is disconnected from the host 2. In the peripheral device 1, a signal having a potential not greater than the predetermined potential is input from the control unit 5*a* to the change-over switch 6 via the control line 7, whereby the circuit of the change-over switch 6 is closed. Then, the potential at the point P is fixed at, for example, a predetermined power supply voltage (high state), and the host 2 identifies that the peripheral device 1 is connected.

As discussed above, the host 2 and the peripheral device 1 are apparently re-connected so that the polling operation can be restarted, thereby enabling the peripheral device 1 to send data.

Figure 1B:
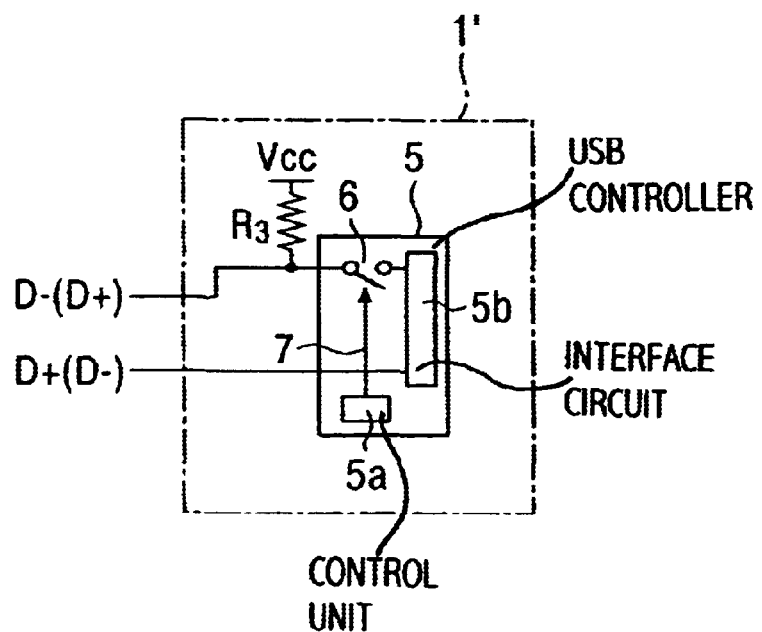
FIG. 1B is a circuit diagram illustrating a peripheral device according to a second embodiment of the present invention.

A peripheral device 1' constructed in accordance with a second embodiment of the present invention is shown in FIG. 1B. In the peripheral device 1', the change-over switch 6, which is disposed outside the USB controller 5 in FIG. 1A, is provided within the USB controller 5. In FIG. 1B, the D− line and the D+ line are connected to an interface circuit 5*b*, and the change-over switch 6 is controlled to be on or off by the control unit 5*a* via the control line 7. The D− line and the D+ line may be located opposite to those discussed above.

By opening the change-over switch 6, the D− line (or D+ line) is changed to a high impedance and is thus set in the low state. The change-over switch 6 is changed from the low state to the high state in a manner similar to the switching operation discussed above.

Figure 2A:
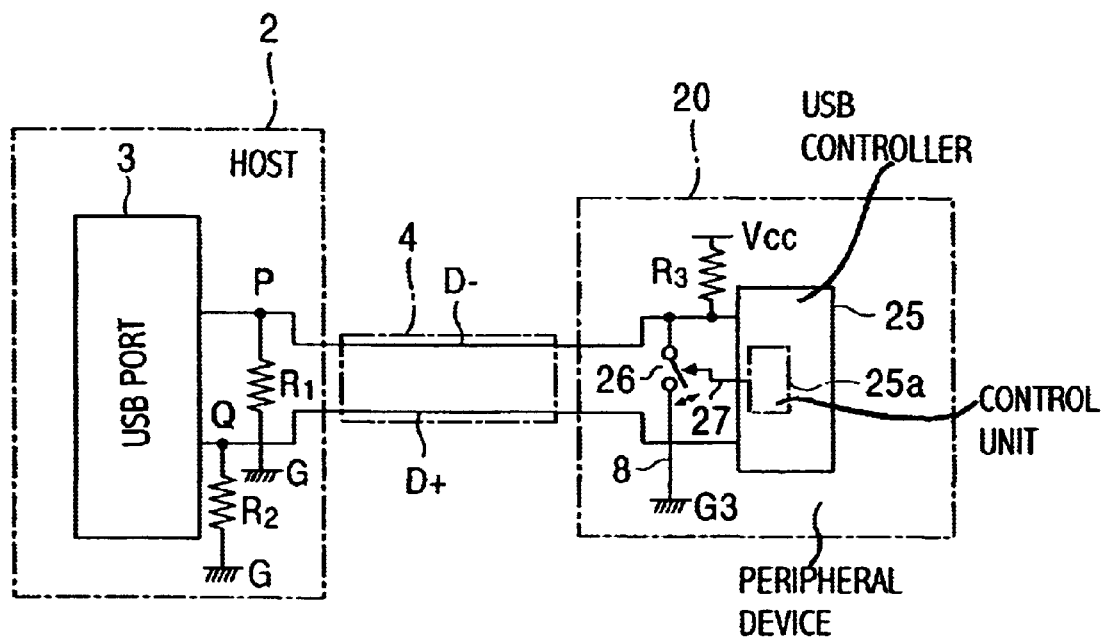
FIG. 2A is a circuit diagram illustrating a connecting unit for a peripheral device according to a third embodiment of the present invention.
Figure 3:
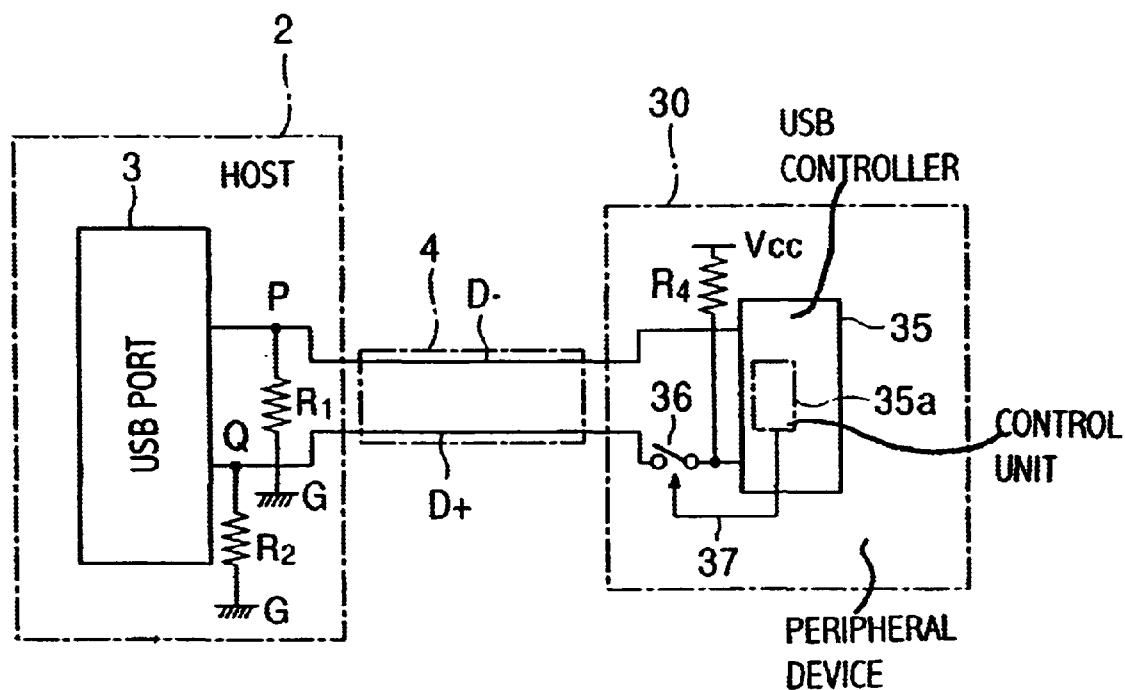
FIG. 3 is a circuit diagram illustrating a connecting unit for a peripheral device according to a fifth embodiment of the present invention.

A peripheral device 20 constructed in accordance with a third embodiment of the present invention is shown in FIG. 2A. The peripheral device 20 is provided with a line 8 on the D− line which is connected to a ground line G3 (which is to be connected to the ground line G of the host 2), and a change-over switch 26 is disposed in the line 8. The change-over switch 26, as in the change-over switch 6, is formed by a regular transistor, and is controlled by a control unit 25*a* disposed within a USB controller 25 via a control line 27. It should be noted that the change-over switch 26 is opened in the normal state. The portions other than the above-described elements are similar to those of the first embodiment shown in FIG. 1A and are designated by like reference numerals. An explanation thereof is thus omitted.

If the polling operation performed by the host 2 is discontinued due to the occurrence of the above-described malfunctions while the peripheral device 20 is connected to the host 2, the circuit of the change-over switch 26 is closed by the control unit 25*a* via the control line 27. That is, a signal having a potential not greater than a predetermined potential is input from the control unit 25*a*, and the change-over switch 26 is closed. Accordingly, the power supplied from the power line Vcc entirely flows into the ground line G3 via the line 8 rather than flowing into the host 2. Thus, the potential at the point P is set to be substantially at the ground potential of the ground line G (low state), and the host 2 determines that the peripheral device 20 is disconnected. Thereafter, a signal having a potential exceeding the predetermined potential is supplied from the control unit 25*a* to the change-over switch 26 via the control line 27, thereby opening the change-over switch 26. Thus, the potential at the point P on the D− line is raised to a predetermined power supply voltage (high state), and the host 2 determines that the peripheral device 20 is connected.

In the peripheral device 20, a circuit consisting of the ground line G3 and the change-over switch 26 may be formed within the USB controller 25, and the change-over switch 26 may be controlled by the control unit 25a.

Figure 2B:
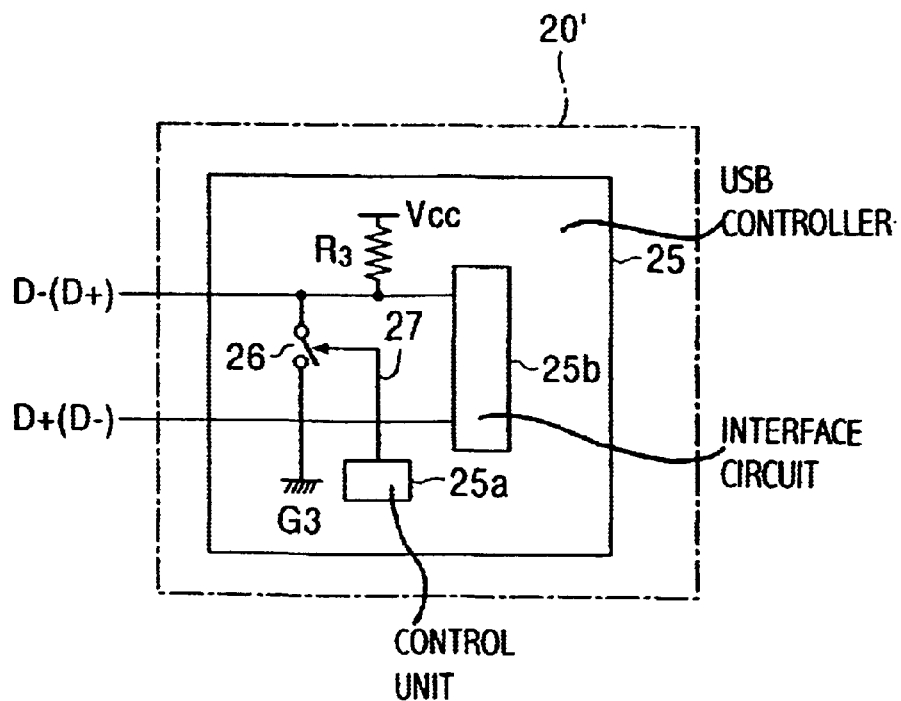
FIG. 2B is a circuit diagram illustrating a peripheral device according to a fourth embodiment of the present invention.

A peripheral device 20' constructed in accordance with a fourth embodiment of the present invention is shown in FIG. 2B. In the peripheral device 20', the change-over switch 26, the pull-up resistor $R_3$, and the power line Vcc, which are disposed outside the USB controller 25 in FIG. 2A, are disposed within the USB controller 25. In FIG. 2B, the D− line and the D+ line are connected to an interface circuit 25b, and the change-over switch 26 is controlled to be on or off by the control unit 25a via the control line 27. The D− line and the D+ line may be located opposite to those discussed above.

With this arrangement, the change-over switch 26 is closed so that the D− line (or D+ line) is connected to the ground and is set in the low state.

FIG. 3 illustrates a high-speed-mode peripheral device 30 constructed in accordance with a fifth embodiment of the present invention. According to the specifications of the peripheral device 30, one end of the pull-up resistor $R_4$ is connected to the D+ line, and the other end is connected to the power line Vcc. A change-over switch 36 is provided for the D+ line of the peripheral device 30, and is controlled to be on or off by a control unit 35a disposed within a USB controller 35 via a control line 37. In the normal state, the change-over switch 36 is closed. When it is determined that the polling operation is not performed by the host 2, the circuit of the change-over switch 36 is opened, and is then closed.

When the peripheral device 30 is connected to the host 2, the D+ line is connected to the power line Vcc via the pull-up resistor $R_4$. If the current is indicated by I, the potential at the point Q shown in FIG. 3 can be expressed by $(R_2/(R_2+R_4))\times I$, and is increased from the ground potential (low state). By detecting this increased potential, the host 2 determines that the peripheral device 30 is connected to the host 2.

The configuration of the peripheral device 30 is not restricted to the fifth embodiment shown in FIG. 3, and the change-over switch 36 may be disposed within the USB controller 35, as in the case of the peripheral device 1' shown in FIG. 1B, and may be controlled to be on or off by the control unit 35a via the control line 37. Alternatively, a circuit consisting of the change-over switch 36, the pull-up resistor $R_4$, and the power line Vcc may be formed within the USB controller 35, as in the case of the peripheral device 20' shown in FIG. 2B, and the change-over switch 36 may be controlled to be on or off by the control unit 35a.

Figure 4:
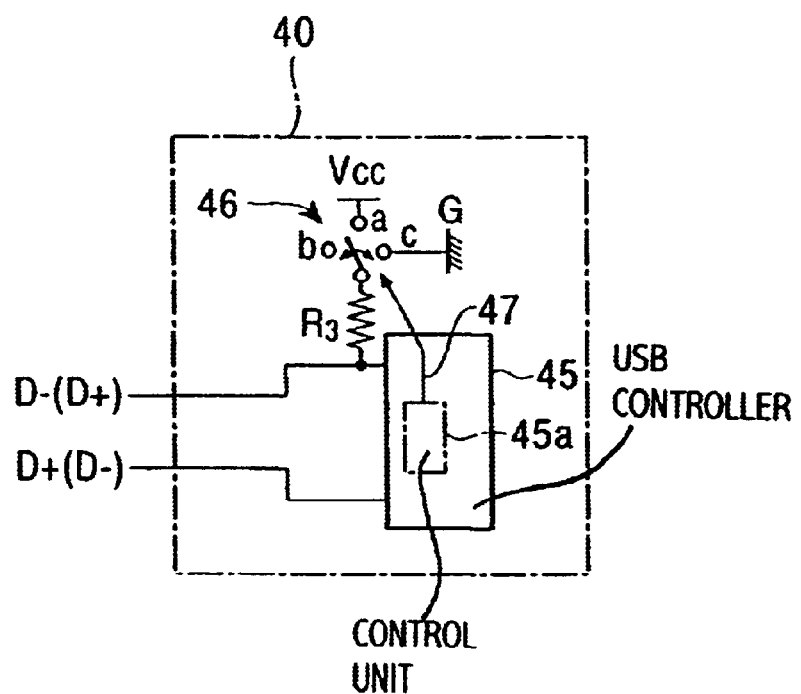
FIG. 4 is a circuit diagram illustrating a peripheral device according to a sixth embodiment of the present invention.

FIG. 4 illustrates a peripheral device 40 constructed in accordance with a sixth embodiment of the present invention. In the peripheral device 40, a change-over switch 46 is provided between the power line Vcc and the pull-up resistor $R_3$. The change-over switch 46 is opened to disconnect the power line Vcc and the pull-up resistor $R_3$. Thus, the portion between the D− line (or D+ line) and the power line Vcc becomes a high impedance and is set to the low state. Alternatively, the pull-up resistor $R_3$ may be connected to the ground G, whereby the D− line (or D+ line) is set to the low state.

More specifically, the change-over switch 46 can be selectively changed among three states, as illustrated in FIG. 4: a connecting state between the power line Vcc and the pull-up resistor $R_3$ (state a), an open state between the power line Vcc and the pull-up resistor $R_3$ (state b), and a connecting state (state c) between the pull-up resistor $R_3$ and the ground line G.

When the change-over switch 46 is changed to the state b by a control unit 45a disposed within a USB controller 45 via a control line 47, the portion between the power line Vcc and the D− line (or D+ line) (data line) becomes a high impedance and is set in the low state. Then, when the change-over switch 46 is changed to the state c, the pull-up resistor $R_3$ is connected to the ground G so that the D− line is set at the ground potential and is thus set in the low state. Accordingly, the host 2 determines that the peripheral device 40 is disconnected.

It is not essential that the change-over switch 46 be changeable among the three states, and it may be changed between the state a and state b or between the state a and the state c.

In the change-over switch 46, as in the case of the peripheral devices 1' and 20' illustrated in FIGS. 1B and 2B, respectively, a circuit consisting of the pull-up resistor $R_3$, the change-over switch 46, the power line Vcc, and the ground G may be formed within the USB controller 45.

In the aforementioned peripheral devices 1, 1', 20, 20', 30, and 40, the control units 5a, 25a, 35a, and 45a may be disposed outside the USB controllers 5, 25, 35, and 45, respectively, and control the change-over switches 6, 26, 36, and 46, respectively.

The configuration of the present invention is not limited to the foregoing embodiments as long as the potential at the point P or the point Q on the data line can be switched between the high state and the low state. For example, the D− line and the D+ line may be short-circuited, or the change-over switch may be provided for a host.

What is claimed is:

1. A connection unit for a peripheral device, which is connected to a host via a data line, said data line being set at a predetermined potential when communication is performed between said peripheral device and said host, said connection unit comprising:

a recovering circuit that establishes an apparently reconnected state between said peripheral device and said host by first changing the potential of said data line from the predetermined potential when communication between said peripheral device and said host is disabled and then changing the potential of said data line back to the predetermined potential, wherein said host regularly calls said peripheral device via said data line, and said recovering circuit establishes the apparently reconnected state between said peripheral device and said host when there is no answer from said peripheral device in response to calling by said host a predetermined number of consecutive times, and wherein said recovering circuit waits until said host has ceased calling before establishing the apparently reconnected state between said peripheral device and said host.

2. The connection unit according to claim 1, wherein said recovery circuit first decreases the potential of said data line to a low state and the increases the potential of said data line to a high state.

3. The connection unit according to claim 1, wherein said data line is connected to a ground via a first resistor in said host and is connected to a power supply via a second resistor in said peripheral device, and said recovering circuit establishes the apparently reconnected state between said peripheral device and said host by setting said data line to a low state in said peripheral device and then by resetting said data line to a high state.

4. The connecting unit according to claim 3, wherein said data line comprises a D− line and a D+ line, and said recovering circuit establishes the apparently reconnected state between said peripheral device and said host by setting at least one of the D− line and the D+ line to the low state in said peripheral device and then by resetting said data line to the high state.

5. The connecting unit according to claim 1, wherein said recovering circuit establishes the apparently reconnected state between said peripheral device and said host by performing one of connecting said data line to a ground and causing a portion between said data line and said power supply to become a high impedance to set the portion to a low state and then resetting the portion to a high state.

6. The connecting unit according to claim 1, wherein said recovering circuit establishes the apparently reconnected state between said peripheral device and said host when detecting that one of a voltage change, a departure of processing from a fixed program routine, and a memory malfunction occurs in said peripheral device.

7. The connection unit according to claim 1, wherein said recovery circuit first increases the potential of said data line to a high state and the decreases the potential of said data line to a low state.

8. The connecting unit according to claim 1, wherein said recovering circuit establishes the apparently reconnected state between said peripheral device and said host when detecting an error in said host.

9. The connecting unit according to claim 1, wherein said recovering circuit is operative to change the potential of said data line by alternate connection to a power supply, a ground, and an open state.

10. A connection unit for connecting a peripheral device to a host via a data line, said data line being in a first state at a first potential when communication is performed between said peripheral device and said host, and wherein, after a communication interruption, said host reestablishes communication upon the potential of said data line changing from said first state to a second state and then returning to said first state, said connection unit comprising:

a switch connected to said data line, said switch connected to change the potential of said data line between said first and second states, and wherein said switch is operative to change the potential of said data line by alternate connection to a power supply, a ground, and an open state;

a control unit that controls said switch to change the potential of said data line from said first state to said second state when said peripheral device detects an interruption in communication between said host and said peripheral device and said control unit then controls said switch to reset said data line potential to said first state.

11. The connection unit of claim 10, wherein said host performs polling and said interruption in communication comprises an interruption in said polling.

12. The connection unit of claim 10, wherein said interruption in communication comprises a malfunction in said peripheral device.

13. The connection unit of claim 10, wherein said switch comprises a transistor.

14. The connection unit of claim 10, wherein said first state is a high potential state and said second state is a low potential state.

15. The connecting unit according to claim 5, further comprising a USB controller, and the recovery circuit including a switch for changing the potential of said data line, wherein said switch is located outside of said USB controller.

16. The connection unit of claim 10, wherein the interruption in communication comprises an error in said host.

17. The connection unit of claim 10, further comprising a USB controller, wherein said switch is located outside said USB controller.

18. The connection unit of claim 11, wherein said control unit waits until said host polling ceases to reset said data line potential to said first state.

* * * * *